United States Patent Office 2,939,372
Patented June 7, 1960

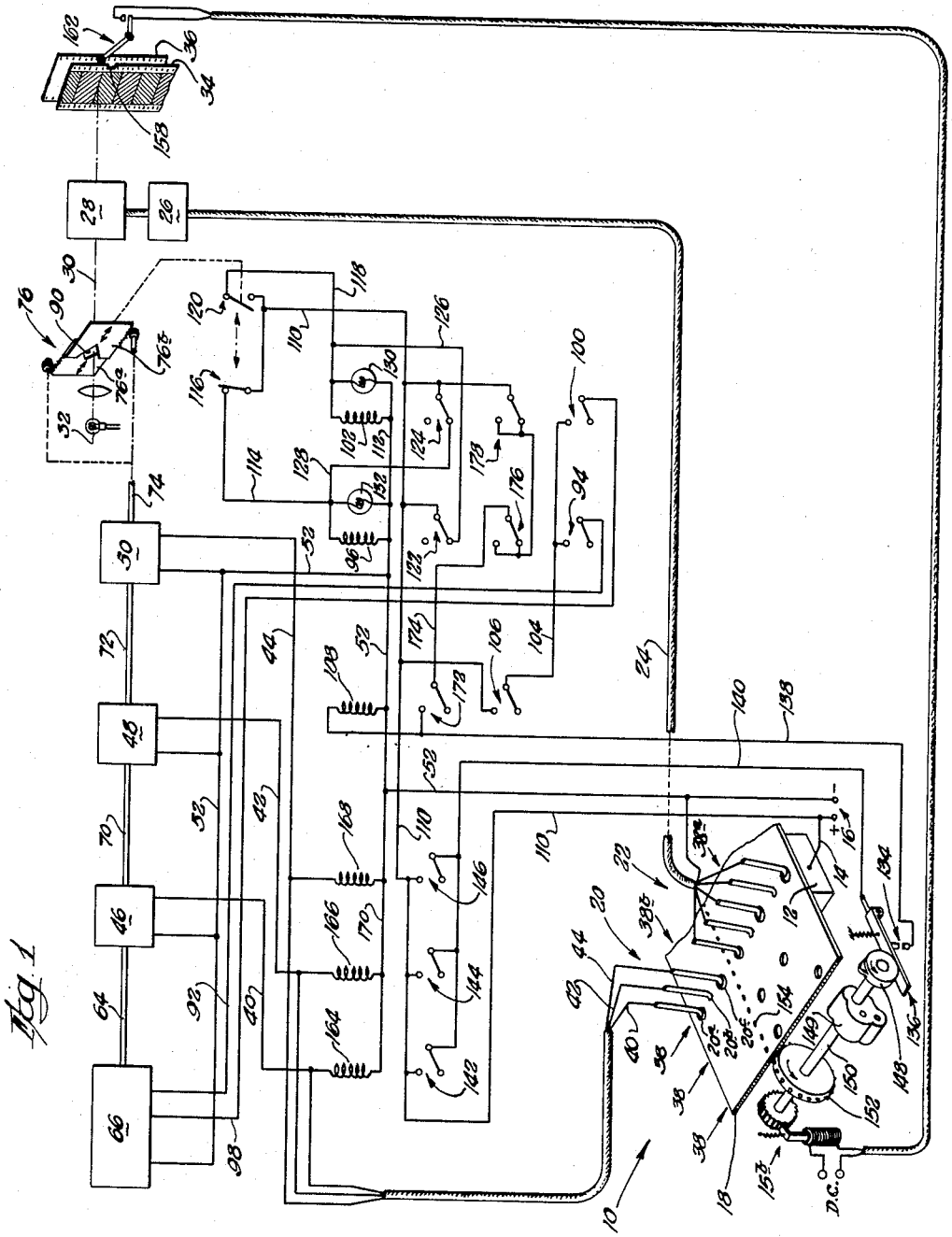

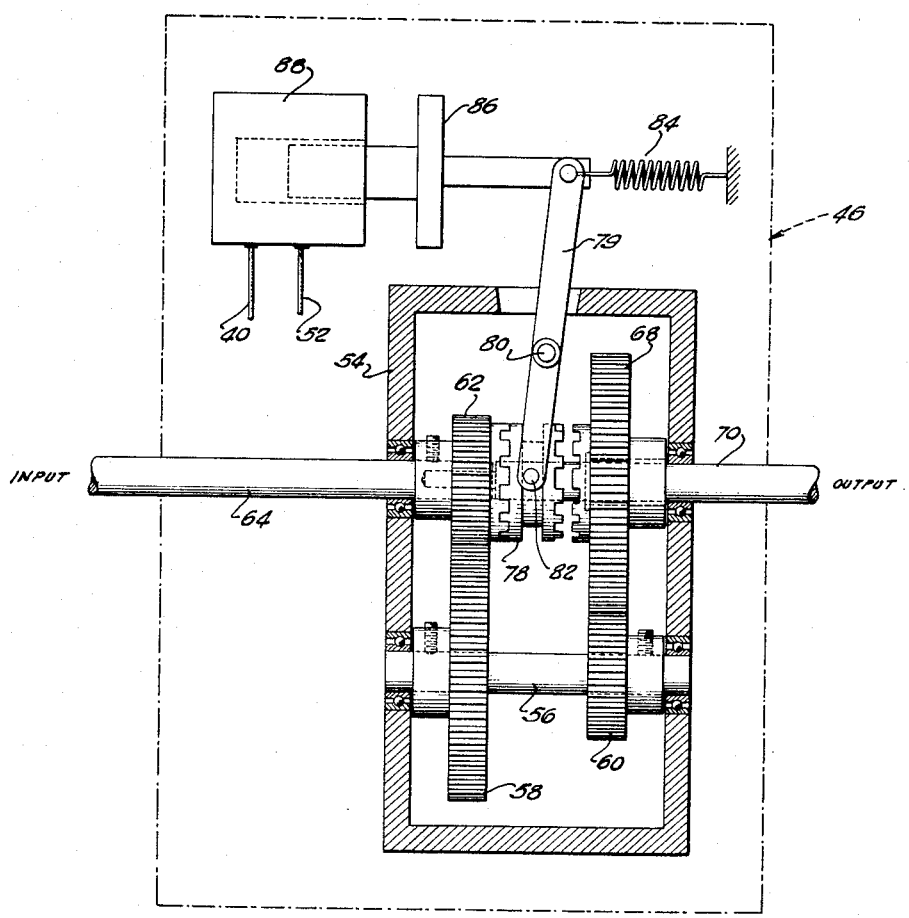

2,939,372

AUTOMATIC FADE DEVICE

Harlan L. Baumbach and Howard M. Little, Los Angeles, Calif., assignors to Unicorn Engineering Corporation, Los Angeles, Calif., a corporation of California Filed Sept. 13, 1956, Ser. No. 609,714

12 Claims. (Cl. 95—75)

This invention relates to motion picture film printing apparatus and particularly to an automatic fade device for film printing machines.

In printing developed film on raw film stock, scenes are frequently faded out or faded in. Thus, for example, transition from one scene to the next is often accomplished by fading out the first scene and fading in the following scene. Generally, these fades are made to occur within the same length of the printed film so as to form what is commonly referred to as a lap dissolve. In other cases, the fade-out and fade-in may occur sequentially in different portions of the print, such as at the beginning or end of the latter.

Fades or dissolves of this character are accomplished by a fade device which consists briefly of mechanism, such as movable shutter plates, capable of progressively varying the intensity of the printing beam at the developed film strip. To effect fade-outs these shutter plates are moved together at a controlled rate to gradually eclipse the printing beam. In fade-ins, the shutter plates are gradually separated so that the printing beam, which is initially entirely blocked out at the raw film stock, is gradually increased in intensity.

To the end of automation in printing operations and increased film printing speeds, it is necessary that the dissolve shutter be automatically controlled in synchronism with feeding of the developed film through the printing beam so that fades will automatically occur at preset rates and at preselected frames of the developed film.

A general object of this invention is the provision of such an automatic fade device for use in motion picture film printing machines which automatically accomplishes fades at preset rates and at preselected frames of the developed film.

Automatic, preselected operation of the fade device of this invention is achieved by the provision of a variable speed drive for operating the dissolve shutter and a control system for this drive embodying a presettable control member having a series of control positions each of which may be preset to establish a predetermined operating speed of the shutter drive. This control system also includes a sensing device for sensing the control positions.

The control member may serve only to establish preset operation of the fade device in which case the developed film strip is formed with cueing notches at each point where a fade is desired. As is well known, however, in printing motion picture film, the intensity and/or color composition of the printing light beam must also be varied from one scene to the next, either to compensate for the varying light conditions under which the developed film strip was originally exposed or to achieve various special effects.

Our copending applications, Serial No. 531,879, filed September 1, 1955, for Automatic Control System for Film Printing Machines and the Like, and Serial No. 589,989, filed June 7, 1956, for Light Modulating Apparatus for Film Printer, disclose automatic light change systems for motion picture film printing machines wherein the intensity and/or color composition of the printing light beam is periodically corrected in response to groups of perforations in a control member or tape. Since fades occur much less frequently than changes in printing light intensity, it will be evident that either separate cueing notches and separate control members can be provided for the light change mechanism and fade device, or a common set of cueing notches and separate control members can be used and the control groups on the control members be so correlated that simultaneous advancing of the members in response to the common set of cueing notches results in operation of the mechanism and device at the proper times.

The use of separate cueing notches and separate control members is, obviously, disadvantageous since it requires duplicate and more complex mechanism and complicates the operations which the reader must perform in viewing the developed film strip.

A novel and simplified solution to the problem of coordinated actuation of the light change mechanism and fade device in response to a common set of cueing notches proposed by the instant invention involves the use of a single control member, or control tape, which is performed with bits of control information which may be groups of control indications, such as perforations. Each of these control groups has a first series of positions for control of the light change mechanism and a second series of positions for control of the fade device. In the automatic light change systems disclosed in the above mentioned copending applications, the controlled elements are five in number and five positions are required in each control group for selective control of the elements to achieve a plurality of different incremental printing light intensities.

In one form of commercial tape reader, up to eight perforations in each control group may be sensed and, for illustrative purposes, the control system of the present invention is disclosed as employing a reader of this type. The first five positions of the tape are reserved for control of the light change mechanism and the last three positions of the tape being employed for control of the present fade device.

Another object of this invention is, therefore, the provision of motion picture film printing apparatus for effecting automatic predetermined changes in printing light intensity and fades at preset rates and preselected frames of the developed film strip.

A further object of the invention is the provision of an automatic control system for use in motion picture film printing apparatus for accomplishing printing light correction and fades and which embodies a single common presetable control member for establishing predetermined printing light corrections, fade locations, and controlled fade rates.

Yet a further object of the invention is the provision of an automatic control system as in the foregoing which is operative in response to a single set of cueing notches in a developed film strip to effect both printing light correction and fade locations and rates.

A still further object of the invention is the provision of an automatic fade device as well as a combined automatic printing light correction and fade control mechanism which are simple in construction and operation, embody a minimum number of parts, and are otherwise especialy well suited to their intended functions.

Briefly, the foregoing as well as other objects and advantages are achieved in the illustrative embodiment of the invention by the provision of a tape reader and control tape therefor, of the type preliminarily mentioned, embodying eight reader brushes and eight positions in each of the control positions on the tape in which a perforation may be preformed. The reader contacts associated with the first five of these positions are connected in the control system of an automatic light change mechanism of the character disclosed in the previously mentioned copending applications.

The reader contacts associated with the three remaining positions are connected in a circuit with three magnetically controlled gear reduction units, having different gear ratios, between a shutter drive motor and a dissolve shutter. The arrangement is such that the speed of the final driven shaft driving the dissolve shutter is selectively controlled by selective energization of the magnetically controlled gear reduction units, in accordance with the perforations present in said last three positions.

Limit switch circuitry associated with the dissolve shutter indicates the condition of the shutter and conditions the system for reversed movement of the shutter on each successive actuation of the fade device. The control circuit of the fade device also embodies various holding circuits for assuring proper operation of the device, as will become readily apparent as the description proceeds.

The invention may be best understood from the following detailed description taken in connection with the accompanying drawings wherein:

Fig. 1 is a schematic circuit diagram of the invention; and

Fig. 2 illustrates one form of magnetically controlled gear reduction unit which may be employed in the present automatic fade device.

Shown at 10 in Fig. 1 is a conventional tape reader comprising a platen 12 connected through a lead 14 to one terminal of a D.C. supply 16. Reader 10 also comprises a series of eight reader contacts or brushes between which and the platen 12 the control tape 18 moves. For facility of description three of these contacts are collectively designated by the numeral 20 and the remaining five contacts by the numeral 22.

Reader contacts 22 are connected through leads 24 to a control system 26 for a light filter mechanism 28 through which the printing light beam 30 passes from a source 32 to the developed film strip 34 for printing on a strip of raw film stock 36 the several scenes of the developed film strip 34. The control system 26 and filter mechanism 28 may be any one of the several forms disclosed in the aforementioned copending applications and serve to vary the intensity of the printing light beam 30 impinging the developed film strip 34 in accordance with the perforations present in the five perforation positions associated with the reader contacts 22. Each group 38 of perforations comprises a coded bit of control information, the portion of each group associated with the reader brushes 22 being designated by the numeral 38a. The operation of the control system 26 and filter mechanism 28 is clearly set forth in the aforementioned copending applications and will not be repeated here.

The remaining three positions in which perforations may be formed in each of the control groups 38 are reserved for controlling the present fade device. The contacts 20 associated with these three positions have been designated by the numerals 20a, 20b and 20c. It will be seen as the description proceeds, that the number of these latter contacts may be increased to achieve a wider range of rate of dissolve. Leads 40, 42, and 44 extend from the contacts 20a, 20b, 20c, respectively, to one terminal of respective ones of three magnetically controlled gear reduction units 46, 48 and 50. The other terminal of each of these units is connected through a common lead 52 to the negative terminal of the D.C. supply 16.

It is evident from what has been said so far, that contact of any one of the reader contacts 20a, 20b or 20c with the reader platen 12 completes a circuit from the positive terminal of D.C. supply 16, through the platen 12, reader contacts 20a, 20b or 20c, leads 40, 42 or 44, the corresponding gear unit 46, 48 or 50, and common lead 52 to the negative D.C. supply terminal 16. That gear unit or those gear units whose corresponding reader contacts engage the platen are thereby energized. Predetermined energizing of these reduction gear units is achieved by providing the proper perforations in the tape positions 38b associated with the respective reduciton gear units.

The three gear reduction units 46, 48 and 50 are substantially identical and differ only in their gear ratio. Accordingly, only one of these units, namely unit 46, shown in detail in Fig. 2, will be described, it being understood that such description will apply equally well to the other gear units 48 and 50 except, as noted above, for their gear ratio. While the gear reduction units may take various forms, they have, for simplicity, been illustrated as comprising a gear case 54 in the lower portion of which is journaled a shaft 56 rigidly mounting a pair of gears 58 and 60. Gear 58 has a greater number of teeth than gear 60 and meshes with a smaller gear 62 fixed on the end of a shaft 64 journaled at one end in the case 54 and coupled at its other end to an electric drive motor 66 (Fig. 1). Gear 60 meshes with a larger gear 68 rotatable on one end of a shaft 70 which is journaled in the gear case 54 and extends to the second gear reduction unit 48. Rigid on the right end of the shaft 70 within the gear reduction unit 48 will be a gear (not shown) corresponding to the gear 62. Similarly a shaft 72 (Fig. 1) journaling thereon within the case of gear reduction unit 48 a gear (not shown) corresponding to the gear 68 extends from the gear unit 48 to the third reduction gear unit 50 and will have rigid on the end thereof within the casing of the latter unit a gear corresponding to the gear 62. A final driven shaft 74, in turn, has journaled on one end thereof, within the case of the gear reduction unit 50, a gear (not shown) corresponding to the gear 68. The latter driven shaft extends to the shutter of dissolve device generally indicated at 76 to be hereinafter more fully described. As shown in Fig. 1, this dissolve device is located in the printing beam 30.

Referring now again to Fig. 2, shaft 70 is seen to project somewhat beyond the inner face of gear 68. Keyed on this extending end of the shaft 70 is a toothed clutch collar 78 which is axially movable on the shaft 70 between the left hand position shown wherein its teeth engage cooperating teeth on the inner face of gear 62 and a right hand position wherein another set of teeth on the clutch collar engage teeth on the inner face of gear 68.

It is evident, therefore, that in the left hand position of clutch collar 78, shaft 64 is directly coupled to shaft 70 so as to be driven at the same rate, gear 68 merely rotating on the shaft 70. In the other or right hand position of the clutch collar 78, on the other hand, gear 68 is clutched to the shaft 70 so that the latter is driven from the shaft 64 through the reduction gearing comprising gears 62, 58, 60 and 68 at a speed determined by the gear ratio of the gearing.

The gear ratio in unit 46 is two to one so that with clutch collar 78 in its right hand position, just described, shaft 70 will be driven at half the speed of shaft 64. Similarly the gearing in reduction unit 48 has a reduction ratio of three to one so that shaft 72 is driven at one-third the speed shaft 70 when its respective clutch collar (not shown) is in its right hand position. Finally reduction unit 50 has a four to one ratio so that the final driven shaft 74 is driven at one-fourth the speed of the shaft 72 when the clutch collar (not shown) in the reduction unit 50 is in its right hand position. It will be seen that by selective positioning of the clutch collars in the three reduction units, the ratio of the speed of the driven shaft 74 to that of the driving shaft 64 may be made 1 : 1, 1 : 2, 1 : 3, 1 : 4, 1 : 6, 1 : 8 (and 1 : 12 and 1 : 24).

Clutch collar 78 is moved between its aforesaid positions by means of an actuating lever 79 pivoted at 80 intermediate its ends to the casing 54 and formed at its inner end with a fork mounting pins 82 slidable in an annular groove in the clutch collar 78. The other end of the lever 79 is biased in one direction, to move the clutch collar 78 to its left hand position wherein there is a one to one drive through the gear reduction unit 48, by means of a tension spring 84.

Fixed to this latter end of the lever 79 is one end of a solenoid plunger 86 which is movable in a solenoid coil 88 having terminals to which the previously mentioned leads 40 and 52 are connected. Thus, energization of the coil 88 by contact of reader contact 20a with the reader platen 12 energizes the coil 88 to retract solenoid plunger 86 to the left, as viewed in Fig. 2, against the action of spring 84 and move the clutch collar 78 to its right hand position wherein a 1 : 2 ratio exists between the speed of the driven shaft 70 and the driving shaft 64.

Similarly, when the solenoid (not shown) embodied in the gear reduction unit 48 is de-energized, there exists a one to one ratio between the speed of driven shaft 72 and the speed of the driving shaft 70. When the latter solenoid is energized, a ratio of 1 : 3 exists between the speeds of these two shafts. Finally when the solenoid (not shown) embodied in the gear reduction unit 50 is de-energized shafts 72 and 74 are driven at the same speed while when the latter solenoid is energized shaft 74 rotates at one-fourth the speed of the shaft 72.

The dissolve shutter 76, which may be any of the well known shutters for this purpose, illustratively comprises a pair of shutter plates 76a and 76b which are relatively movable toward and away from one another to vary the size of an aperture 90 defined by V-shaped slots in the inner edges of the plates. This aperture is arranged in the printing light beam, as shown in Fig. 1, so that the latter may be gradually entirely cut off at the film strips 34 and 36 by movement of the plates 76a and 76b together or gradually increased in intensity from complete darkness at the film to the full intensity of the beam, as determined by the filter mechanism 28, by movement of the plates 76a and 76b apart. Accordingly, the final driven shaft 74 is operatively coupled, as indicated in Fig. 1, to the shutter plates for opposite movement of the latter in a direction and at a rate determined by the speed and direction of rotation of the driven shaft 74. The circuitry just described is effective to control the rate of closure or separation of the shutter plates 76a and 76b to vary the rate at which the fade-out or fade-in occurs and, therefore, the length of film 36 over which the fade takes place. The remainder of the circuitry of the control system, to be now described, is effective to control energizing of the drive motor 66 to initiate the fade and to determine the direction of the fade, that is whether there is a fade-in or a fade-out.

To this end, one terminal of the motor 66 is connected to the common lead 52 extending to the negative terminal of the D.C. supply 16. The motor 66, which is of the reversible type, is provided with a pair of second terminals one of which is connected through a lead 92 to one terminal of a pair of normally open contacts 94 of a relay including a coil 96. The other second terminal of the drive motor 66 is connected through a lead 98 to one terminal of a pair of normally open contacts 100 of a relay including the coil 102.

The other terminals of the normally open contacts 94 and 100, which serve to establish opposite directions of rotation of the motor 66, are connected through a common lead 104, including normally open contacts 106 of a relay including a coil 108, to a lead 110 extending to the positive terminal of the D.C. supply 16. Thus, with normally open contacts 106 and 94 or 100 closed, motor 66 is energized, the direction of rotation of the motor being determined by which of the direction contacts 94 and 100 is closed.

Closure of contacts 94 and 100 is effected by energizing of their respective solenoid coils 96 and 102, the latter coils having one terminal connected through a common lead 112 to the lead 52 extending to the negative terminal of the D.C. supply 16. The other terminal of relay coil 96 is connected via a lead 114 to one terminal of a limit switch 116 which is closed when the shutter plates 76a and 76b are separated to their extreme limit, and which is opened in response to closing movement of the shutter plates. The other terminal of the open limit switch 116 is connected to the D.C. supply lead 110 leading to the positive terminal of the D.C. supply 16 so that coil 96 is energized and its contacts 94 are closed by closing of the open limit switch 116.

Similarly, the other terminal of relay coil 102 is connected via a lead 118 to one terminal of a limit switch 120 which is closed whenever the shutter plates 76a and 76B are closed to their extreme limit, wherein the aperture 90 is entirely closed and the printing beam is cut off at the film. This latter switch is opened in response to separation of the shutter plates. The other terminal of this latter closed limit switch is connected through the lead 110 to the positive terminal of the D.C. supply 16 so that the relay coil 102 is energized to close its normally open contacts 100 by closing of the closed limit switch 120.

The limit switches 116 and 120 perform the dual function of terminating operation of the drive motor 66 whenever the shutter plates 76a and 76b have been driven to either of their extreme limits and also to initiate conditioning of the control system for reversal of the direction of movement of the shutter plates after each fade. That is, for example, if a given fade is a fade-out, the shutter plates 76a and 76b are moved to closed position. Closed limit switch 120, which will be open during the fade, is closed at the termination of the fade to effect operation of the circuitry, as described below, in such a manner that the next time the drive motor 66 is energized to effect a fade, its direction of rotation will be preset to cause separation of the shutter plates 76a and 76b for a fade-in.

To this end, there is associated with each of the relay coils 96 and 102 a set of normally closed contacts 122 and 124, respectively, one terminal of each of which is connected to the positive terminal of the D.C. supply 16 through lead 110. The other terminal of the normally closed contacts 122 is connected through a lead 126 to the upper or limit switch end of the relay coil 102. The other terminal of the normally closed contacts 124, associated with the relay coil 102, is connected via a lead 128 to the upper or limit switch end of the relay coil 96.

Thus the circuitry is such that when the open limit switch 116 is closed, due to the shutter plates 76a and 76b being in their extreme open position, relay coil 96 is energized to close its normally open contacts 94. The system is thereby preconditioned for rotation of the drive motor 66 in a direction to close the shutter plates on the next energization of the motor, and to open normally closed contacts 122. These latter contacts serve, in effect, as holding contacts for the relay coil 102 and retain the latter energized during movement of the shutter plates from a closed condition to an open condition. Accordingly, normally open contacts 100 of the latter relay coil will be retained closed during this movement of the shutter plates and the motor 66 will continue to drive even though the limit switch 120 opens as it does immediately after movement of the shutter plates away from their closed position.

It is evident therefore that energization of the relay coil 96 by closure of the open limit switch 116 results in breaking of the holding circuit for the relay coil 102. Since the closed limit switch 120 of the latter relay coil will be open at this time, the coil 102 de-energizes with resultant closing of its normally closed contacts 124 to complete a holding circuit for the relay coil 96. The latter coil therefore, remains energized during subsequent movement of the shutter plates to closed position even though limit switch 116 opens at the initiation of this movement.

Similarly, upon movement of the shutter plates to their closed position, limit switch 120 is closed to energize the coil 102. Normaly open contacts 100 of coil 102 thereby close to precondition the system for driving of the motor 66 in a direction to open the shutter upon the next energization of the motor. Also, energizing of relay coil 102 opens its normally closed contacts 124 to break the holding circuit for the relay coil 96 which de-energizes since its associated open limit switch 116 is open.

Indicator lights 130 and 132 are connected in shunt with the coils 96 and 102 so as to be energized whenever their respective coils are energized. These indicator lights serve to indicate the previous position of the shutter; that is, indicator light 130 will be lit whenever the shutter plates 76a and 76b are entirely closed as well as during movement of the shutter plates from their closed to their open positions. Similarly, indicator light 132 will be energized whenever the shutter plates 76a and 76b are in their extreme open positions as well as during movement of the shutter plates from their open position to their closed position.

It will be seen that there has been so far described, circuitry for first determining the rate at which the shutter plates 76a and 76b close or open and therefore the rate at which the fade-out or fade-in takes place, and second for determining the direction of movement of the shutter plates, that is whether the fade is a fade-out or fade-in.

There remains to be discussed, therefore, a final consideration in the operation of the fade device, namely that of initiation of operation of the drive motor 66 to accomplish movement of the shutter plates in the direction and at the rate determined by the operation of the circuitry thus far described. As previously mentioned, energizing of the drive motor 66 is controlled by closing of the normally open contacts 106 in response to energizing of the relay coil 108, the latter having one terminal connected to the D.C. supply lead 52.

Energizing of the relay coil 108 is accomplished by closure of normally open contacts 134 of a stretched relay 136. One of the contacts 134 is connected through a lead 138 to the other terminal of the relay coil 108 and the other of the contacts 134 is connected via a lead 140 to one of the terminals of three normally open sets of contacts 142, 144 and 146. The other terminals of these latter contacts are connected to the D.C. supply lead 110 extending to the positive terminal of the D.C. supply 16. Thus, upon closure of the stretched relay contacts 134 and any one or more of the normally open contacts 142, 144 and 146 an energizing circuit is completed through the relay coil 108 to close its normally open contacts 106, thereby energizing the motor 66.

Relay 136 is a conventional stretched relay which remains closed for predetermined period of time once it is closed. Closure of this relay is accomplished by a cam 148 driven from the shaft 150 of the reader 10 through step-up gearing 149. This shaft 150 also mounts a sprocket 152 whose teeth engage in sprocket holes 154 in the control tape 18. Shaft 150 is rotated to advance the tape 18 and aline a following control group 38 with the reader contacts 20 and 22 by operation of mechanism 156 actuated each time a cueing notch 158 in the developed film strip passes an interrupter switch 162. For further description of this tape advance mechanism reference may be had to the aforementioned copending applications. The ratio of the step-up gearing 149 is such that cam 148 is rotated one revolution during each advance of tape 18. The cam 148 is so orientated as to effect closure of the stretched relay 134 after the cam has rotated through 180 degrees.

Contacts 142, 144 and 146 are embodied in relays having relay coils 164, 166 and 168, respectively. One terminal of each of these relay coils is connected through a common lead 170 to the D.C. supply lead 52 extending to the negative terminal of the D.C. supply 16. The other terminals of the latter relay coils 164, 166 and 168 are connected to the leads 40, 42 and 44, respectively, leading to the reader contacts 20 associated with the fade device. Thus, coils 164, 166 and 168 are energized to close their respective normally open contacts 142, 144 and 146 in accordance with the perforations present in section 38b of each of the control groups on the control tape.

During operation of this system, to be presently more fully described, relay 136 is closed, by operation of the cam 148, in response to each advance of the tape 18 to aline a subsequent control group 38 with the reader contacts 20 and 22. The relay 136 is so adjusted that its contacts will remain closed until after the next following control group or position has been alined with the reader contacts. If such following control group does not contain a perforation in any one or more of the positions 38b associated with the fade device, relays 164, 166 and 168 and therefore, coil 108 remain de-energized even though the stretched relay 136 is closed.

If, however, one or more of the perforations in the fade device portion 38b of the control tape are present in the following control group, the corresponding relay coils 164, 166, 168 will be energized to close their respective normally open contacts 142, 144 and 146. An energizing circuit is thereby completed from the positive terminal of the D.C. supply 16 through lead 110, the closed contacts 142, 144 and 146 as the case may be, lead 140, stretched relay contacts 134, relay coil 108, and lead 52 to the negative terminal of the D.C. supply 16. Relay coil 108 thus energizes to close its normally open contacts 106 and cause driving of the motor 66 in a direction determined by which of the direction contacts 94 or 100 are closed.

Relay 136 is adjusted to open shortly after coil 108 energizes in response to perforations in the tape. To maintain relay coil 108 energized after opening of relay 136 and until a fade-out or fade-in is completed, the present control system embodies a holding circuit for the relay coil 108. This holding circuit comprises a set of normally open contacts 172 of the relay coil 108 which are closed whenever the relay coil 108 is energized. One terminal of these latter contacts is connected to the lead 138 while the other terminal of the contacts 172 is connected through a lead 174, including a pair of contacts 176 and 178, to the D.C. supply lead 110.

These latter contacts 176 and 178 are in the relays including the relay coils 96 and 102, respectively, and in each of their positions are closed. Thus, once relay coil 108 energizes, its contacts 172 close to complete a circuit in shunt with the stretch relay 136 and relay contacts 142, 144 and 146 which locks the relay 108 in energized condition even though the stretch relay 136 or all of the contacts 142, 144 and 146 open. Upon movement of the shutter plates 76a and 76b to either of their extreme limits with resultant closing of one or the other of the limit switches 116 and 120, one of the relay coils 96 and 102 is energized and the other is de-energized so that the contacts 176 and 178 are operated with resultant momentary breaking of the holding circuit for coil 108 and de-energizing of the latter to condition the system for the next fade.

OPERATION

The developed film strip 34 is initially viewed by a reader who, through the operation of suitable mechanism, not shown, forms in the developed film strip a series of cueing notches 158 positioned along the developed film in accordance with the desired locations of fades or light intensity changes.

Simultaneously the reader forms in the control tape 18 such perforations in section 38a thereof as will yield the desired printing light intensity. If a fade-out or fade-in is to occur, the reader will form in section 38b of the control tape such perforation as will yield the desired fade rate.

The shutter plates 76a and 76b are initially positioned at one of their extreme limits in accordance with the type of fade which is to occur first. Thus, if the first fade is to be a fade-out, the shutter plates 76a and 76b are initially positioned in their extreme open position while if the first fade is to a fade-in, shutter plates 76a and 76b are positioned in their extreme closed condition.

The tape is now manually or automatically advanced to aline the first control group 38 on the tape 18 with the reader contacts, in the manner described fully in my above mentioned copending applications, to establish the proper light intensity for printing of the first scene of the developed film strip. Assuming for the moment, that the control tape is formed with the perforations illustrated in Fig. 1, so that the first fade, to be a fade-out, is to occur after two changes in printing light intensity have been made, the developed film strip 34 and positive film stock 36 are fed through the printing light beam 30, the first scene of the developed film strip being printed with a light intensity determined by the light change perforations 38a present in the first control group 38.

Upon passage of the first cueing notch 158 past the interrupter switch 162, the tape 18 is advanced to aline the second control group 38 on the control tape with the reader contacts and a second predetermined light intensity is established in accordance with the light change perforations present in the second control group. The fade device, however, remains inoperative owing to the absence of perforations in the fade device section 38b of the control tape. During this advancing of the tape, of course, stretched relay 136 is closed by operation of cam 148 but since relay coils 164, 166 and 168 remain de-energized, relay coil 108 also remains de-energized and the drive motor 66 of the fade device remains inoperative.

Upon passage of the third cueing notch 158 past the interrupter switch, tape 18 is again advanced to aline the third control group on the control tape with the reader contacts. This control group contains either the same or different light change perforations depending on whether or not a change in light intensity is desired at this portion of the developed film strip. It will be observed, however, that in fade device section 38b of the control tape, perforations associated with reader contacts 20a and 20c are present so that upon alining of the third control group with the reader contacts, contacts 20a and 20c contact the platen 12.

During this last advancing of the control tape 18, cam 148 will have been rotated to close relay 136 which, as previously indicated, remains closed for a given period of time and until after the last mentioned control group has become alined with the reader contacts. Accordingly, contact of reader contacts 20a and 20c with the reader platen 12 energizes reduction gear units 46 and 50 to provide a 1:8 ratio between the speed of the driven shaft 74 and that of the driving shaft 64. Also relay coil 164 and 168 are energized to close their normally open contacts 142 and 146. Since the relay 136 is closed, closure of contacts 142 and 146 completes an energizing circuit through the relay 108 with resultant closing of its normally open contacts 106 and 172.

At this time, contacts 176 and 178 of the relay coils 96 and 102 are both closed so that the aforementioned holding circuit for the relay coil 108 is completed from lead 52 extending to the negative terminal of the D.C. supply 16, through the coil 108, contacts 172, lead 174, contacts 176 and 178 to the positive D.C. supply lead 110. Relay 108 is thereby locked in energized condition.

Assuming, as indicated above, that the shutter plates 76a and 76b are separated to their extreme limit, the open limit switch 116 is closed so that relay coil 96 is energized and direction contacts 94 closed. Accordingly, closure of contacts 106 of the relay coil 108 results in energizing of the motor 66 and driving of the latter in a direction to close the shutter plates at the previously mentioned rate.

Motor 66 continues to drive until the shutter plates 76a and 76b are completely closed at the termination of the fade-out with resultant closure of the closed limit switch 120. Closure of limit switch 120 energizes relay coil 102 to open its normally closed contacts 124 in the holding circuit for relay coil 96. The latter coil de-energizes and its contacts return to their normal position.

Energizing of the relay coil 102 also closes its normally open contacts 100 and moves its contacts 178 to their other position. Relay 136 is so adjusted that it reopens prior to termination of the most rapid fade. Accordingly, the momentary interruption in the holding circuit for relay coil 108, resulting from movement of the contacts 176 and 178, as just mentioned, results in de-energizing of the relay coil 108 and, therefore, motor 66. Closure of normally open contacts 100 of the relay coil 102, of course, conditions the drive motor 66 for driving in a direction to reopen the shutter plates 76a and 76b during the following fade.

In some cases, a printing light change may be effected during a fade, and in such instances, the tape 18 is advanced in response to a cueing notch on the developed film strip. This, of course, does not interrupt the completion of the fade even through contact between the reader contacts 20a and 20c and the reader platen 12 is thereby interrupted, owing to the aforementioned operation of the holding circuit for the relay coil 108 which maintains motor 66 energized. Opening of the stretched relay 136, prevents continuing reversed operation of the motor 66 in the event that control tape 18 is not advanced during a given fade. In the absence of the relay 136, obviously, the motor 66 would continue to drive until the tape was advanced.

The fade device now remains inoperative until the tape is advanced to a following control group containing one or more perforations in section 38b of the tape whereupon the fade device is actuated, in the manner just described, to reopen the shutter plates 76a and 76b at a rate determined by the perforations present in such control group.

From the foregoing description it will be evident that there has been disclosed a greatly simplified, automatic fade device which is usable alone as well as an automatic system for controlling both printing light correction and fades from a single control member which is advanced in response to a single set of cueing notches on the developed film strip. It will be immediately evident to those skilled in the art that numerous modifications of the fade device are possible. Thus, for example, in lieu of utilizing a reversible drive motor 66, a single drive motor and a magnetically operated magnetic clutch device might be employed for effecting reverse directions of rotation of the drive shaft 64.

Also, in lieu of using a number of gear units, such as three as in the disclosed embodiment of the invention, which effect, by their cumulative action, a number of driven shafts speeds which is greater than the number of clutch units, it is apparent a number of units equal to the number of different shaft speeds desired could be employed and so arranged that a given one of the units is energized to effect the desired speed of rotation of the final driven shaft 74. There is, for example, in existence a commercial printer which utilizes such a series of singly energized reduction units, each with a different gear ratio, for effecting the desired closure speed of the shutter plates. Control of these units in the prior system is, however, manual. In view of what has been said above, however, it will be obvious that the present automatic fade control system may be modified for use with such an arrangement without departing from the spirit and scope of this invention.

Accordingly, while a present, preferred embodiment of the invention has been disclosed and illustrated, it should be understood that numerous modifications in design, arrangement of parts and instrumentalities are possible within the scope of the following claims.

We claim:

1. An automatic fade device for motion picture film printing machines having means for directing a printing light beam through a developed film strip to a strip of raw film stock, said device comprising: shutter means located in said beam and operable between completely closed and completely open positions to progressively vary the intensity of the beam impinging on the developed film strip, a control system for operating said shutter means between said positions at different preselected rates including a control member adapted to be preset with bits of control information each corresponding to a predetermined rate of operation of said shutter means, sensing means for sensing the information bits, means for intermittently advancing said control member past the sensing means to sequentially operatively aline said information bits with said sensing means, reversible drive means for operating said shutter means between said positions in response to sensing of each of said information bits by said sensing means and at a rate determined by the information bits currently alined with the sensing means, and limit means operative in response to operation of said shutter means to each of said positions to terminate operation of the shutter means by the drive means and precondition said control system for reversed operation of the shutter means by the drive means in response to the sensing of the next following information bit by said sensing means.

2. The subject matter of claim 1 wherein said shutter drive means comprise electrical means adapted to be energized to cause operation of said shutter means in response to the sensing of each of said information bits by said sensing means, said control system including holding circuit means for maintaining said electrical means energized once the latter is energized in response to sensing of a given information bit by said sensing means, and said limit means including contact means in said holding circuit means operative to momentarily open the latter circuit means and de-energize said electrical means in response to operation of the shutter means to each of said limiting positions.

3. The subject matter of claim 1 wherein said shutter drive means comprise electrical means adapted to be energized to cause operation of said shutter means between said positions, said control system including energizing circuit means for said electrical means including contact means in said sensing means which are closed in response to sensing of each of said information bits by the sensing means to initially energize said electrical means, holding circuit means for maintaining said electrical means energized during operation of said shutter means from one of said positions to the other after initial energizing thereof, said limit means including means for de-energizing said holding circuit means upon operation of the shutter means to either position, and normally open delay switch means in series with said contact means arranged to be closed in response to each advancing of said control member to operatively aline a following information bit with the sensing means, said latter switch means remaining closed for a predetermined period of time sufficient to assure operative alining of said following information bit and sensing means and opening prior to de-energizing of said holding circuit means.

4. An automatic fade device for motion picture film printing machines having means for directing a printing light beam through a developed film strip to a strip of raw film stock, said device comprising: dissolve means for gradually varying the intensity of said printing beam at the developed film strip, said dissolve means being operable between a first position wherein said beam is completely cut off at the developed film strip and a second position wherein the intensity of said beam at the developed film strip is substantially unaffected by said dissolve means; selectively energizable means for operating said dissolve means between said positions at different preset speeds determined by the selective energization of said latter means; and selectively actuatable control means for said selectively energizable means including presettable means for effecting preselected energizing of said selectively energizable means to operate said dissolve means from one position to the other at a preselected speed in response to each actuation of said control means, and means responsive to operation of said dissolve means to either position to deactivate said selectively operable means and condition said control means for effecting subsequent operation of said dissolve means to the opposite position in response to the next actuation of said control means.

5. An automatic fade device for motion picture film printing machines having means for directing a printing light beam through a developed film strip to a strip of raw film stock, said device comprising: dissolve means for gradually varying the intensity of said printing beam at the developed film strip, said dissolve means being operable between a first position wherein said beam is completely cut off at the developed film strip and a second position wherein the intensity of said beam at the developed film strip is substantially unaffected by said dissolve means; selectively energizable means for operating said dissolve means between said positions at different preset speeds determined by the selective energization of said latter means; and intermittently actuatable control means for said selectively energizable means including presettable means for effecting initial preselected energizing of said selectively energizable means to initiate operation of said dissolve means from one position to the other at a preselected speed in response to each actuation of said control means, holding means responsive to initial energizing of said selectively energizable means for retaining the latter means energized during operation of said dissolve means from one position to the other, and means for deactivating said holding means in response to operation of said dissolve means to either position and conditioning said control means for subsequent operation of said dissolve means to the opposite position in response to the next actuation of said control means.

6. An automatic fade device for motion picture film printing machines having means for directing a printing light beam through a developed film strip to a strip of raw film stock, said device comprising: dissolve means for gradually varying the intensity of said printing beam at the developed film strip, said dissolve means being operable between a first position wherein said beam is completely cut off at the developed film strip and a second position wherein the intensity of said beam at the developed film strip is substantially unaffected by said dissolve means; operating means for operating said dissolve means between said positions including a plurality of electrical means adapted to be selectively energized to effect operation of said dissolve means between said positions at different preset speeds; and intermittently actuatable control means for said operating means including presettable means for effecting preselected energizing of said electrical means to cause operation of said dissolve means from one position to the other at a preselected speed in response to each actuation of said control means, and means responsive to operation of said dissolve means to either position for deenergizing said electrical means and conditioning said control means for subsequent operation of said dissolve means to the opposite position in response to the next actuation of said control means.

7. An automatic fade device for motion picture film printing machines having means for directing a printing light beam through a developed film strip to a strip of raw film stock, said device comprising: dissolve means for gradually varying the intensity of said printing beam at the developed film strip, said dissolve means being operable between a first position wherein said beam is completely cut off at the developed film strip and a second position wherein the intensity of said beam at the developed film strip is substantially unaffected by said dissolve means; operating means for operating said dissolve means between said positions including variable speed drive means for said dissolve means including selectively energizable electrical means for controlling the speed of operation of said dissolve means by said drive means; and intermittently actuatable control means for said drive means including presettable means for effecting selective energizing of said electrical means to cause operation of said dissolve means from one position to the other at a preselected speed in response to each actuation of said control means, and means responsive to operation of said dissolve means to either position for terminating operation of said drive means and conditioning said control means for subsequent operation of said dissolve means to the opposite position in response to the next actuation of said control means.

8. An automatic fade device for motion picture film printing machines having means for directing a printing light beam through a developed film strip to a strip of raw film stock, said device comprising: dissolve means for gradually varying the intensity of said printing beam at the developed film strip, said dissolve means being operable between a first position wherein said beam is completely cut off at the developed film strip and a second position wherein the intensity of said beam at the developed film strip is substantially unaffected by said dissolve means; constant speed drive means for said dissolve means, a series of electrically controlled gear units between said drive means and dissolve means, said gear units being operatively connected in mechanical series, each unit having a one to one drive ratio in one condition of energization and a given drive ratio in another condition of energization, said given ratios of the several units being different whereby said units may be individually operated or operated in combination to provide a desired rate of operation of said dissolve means; and selectively actuatable, presettable control means for effecting preselected energizing of said units to operate said dissolve means from one position to the other at a preselected speed in response to each actuation of said control means, said control means including means responsive to operation of said dissolve means to either position for terminating operation of said dissolve means and conditioning said control means for operation of said dissolve means to the opposite position in response to the next actuation of said control means.

9. In a motion picture film printing machine having means for directing a printing light beam through a developed film strip to a strip of raw film stock, the improvements comprising printing light correction means for adjusting the intensity of said beam to establish different predetermined printing light intensities at the developed film strip, dissolve means for varying the intensity of the beam at the developed film strip, said dissolve means being operable between a first position wherein said beam is completely cut off at the developed film strip and a second position wherein the intensity of said beam at the developed film strip is substantially unaffected by said dissolve means, selectively actuatable operating means for said correction means and dissolve means including a control tape reader through which a control tape bearing coded bits of control information is adapted to be intermittently advanced to successively align said bits with the reader, said reader including a series of electrical contacts which are selectively operated by each bit of control information, means including a first group of said contacts for operating said light correction means to establish said different predetermined printing light intensities in response to operation of said first group of contacts in different preselected combinations, and means including a second group of said contacts for operating said dissolve means between said positions in alternate fashion at different predetermined rates in response to operation of said second group of contacts in different preselected combinations.

10. In a fade device of the character described, dissolve means operable between given limiting positions, variable speed drive means for operating said dissolve means between said positions at different preselected speeds including selectively energizable speed changing means adapted to be selectively energized to preset said drive means for operating said dissolve means at different preselected speeds, means for controlling the operation of said drive means including relay means, said relay means having a normal condition wherein said drive means is inoperative, means for operating said relay means to another condition to cause operation of said drive means in response to each selective energization of said speed changing means, holding means for retaining said relay means in said other condition, limit means for deactivating said holding means upon operation of dissolve means to either position, and reversing means for conditioning said drive means for reversed operation of said dissolve means to the opposite position upon operation of the dissolve means to either position.

11. An automatic fade device for a motion picture film printing machine having means to direct a printing light beam through a developed film strip to raw film stock therebehind, comprising: a dissolve shutter positionable in said beam and movable between open and closed positions to progressively eclipse and expose the printing beam at the film; an electric, variable speed drive means drivably connected to said shutter to move the latter between said positions at different predetermined shutter speeds including a plurality of electrical speed control means which are adapted to be selectively energized to set the drive means for the different shutter speeds; information storage means adapted to be preset with bits of control information each corresponding to a selected predetermined shutter speed; means to sense said bits of control information, said sensing means including a plurality of contacts which are selectively actuated in accordance with the control information contained in each bit; means connecting said contacts in electrical circuit with said speed control means for selective energization of the latter by said contacts to set the drive means for the predetermined shutter speed corresponding to each bit of information; switch means to be operated in synchronism with movement of film through the printer; and means controlled by said switch means to advance said information storage means past the sensing means from one bit to the next and to energize said drive means for moving the shutter from its current position to its other position at the predetermined shutter speed for which the drive means is set.

12. In a motion picture film printing machine having means to direct a printing light beam through a developed film strip to a strip of raw film stock, printing light correction means to adjust the intensity of said beam to different predetermined levels at the developed film strip; a dissolve shutter in the path of said beam movable between open and closed positions to progressively eclipse and expose the beam at the film at different predetermined shutter speeds; information storage means to be preset with successive control groups each adapted to contain printing light intensity information corresponding to a selected printing light intensity and fade information corresponding to a selected shutter speed; means for sensing said control information including a first set of contacts which are selectively operated in accordance with the light intensity information and a second set of contacts which are selectively operated in accordance with the fade information; means for advancing said information storage means past the sensing means to successively align said control groups with the sensing means in synchronism with movement of film through the printer; means including said first set of contacts for operating said light correction means to establish the printing light intensity level corresponding to the intensity control information in each control group; and means including said second set of contacts for operating said shutter from its current position to its other position at the shutter speed corresponding to shutter control information contained in any control group.

References Cited in the file of this patent

UNITED STATES PATENTS

| | | |
|---|---|---|
| 1,572,798 | Hubbard et al. | Feb. 9, 1926 |
| 2,061,069 | Garbutt et al. | Nov. 17, 1936 |
| 2,368,804 | Chatelain | Feb. 6, 1945 |
| 2,440,906 | Metzger | May 4, 1948 |
| 2,573,405 | Clark | Oct. 30, 1951 |

FOREIGN PATENTS

| | | |
|---|---|---|
| 456,617 | Great Britian | Nov. 12, 1936 |